Aug. 10, 1937.   A. F. BENSON   2,089,873
CONTROLLING DEVICE
Filed July 8, 1932   3 Sheets-Sheet 1

Arthur F. Benson
INVENTOR.

BY
ATTORNEYS.

Aug. 10, 1937.   A. F. BENSON   2,089,873
CONTROLLING DEVICE
Filed July 8, 1932   3 Sheets-Sheet 2

Arthur F. Benson
INVENTOR.
BY
ATTORNEYS.

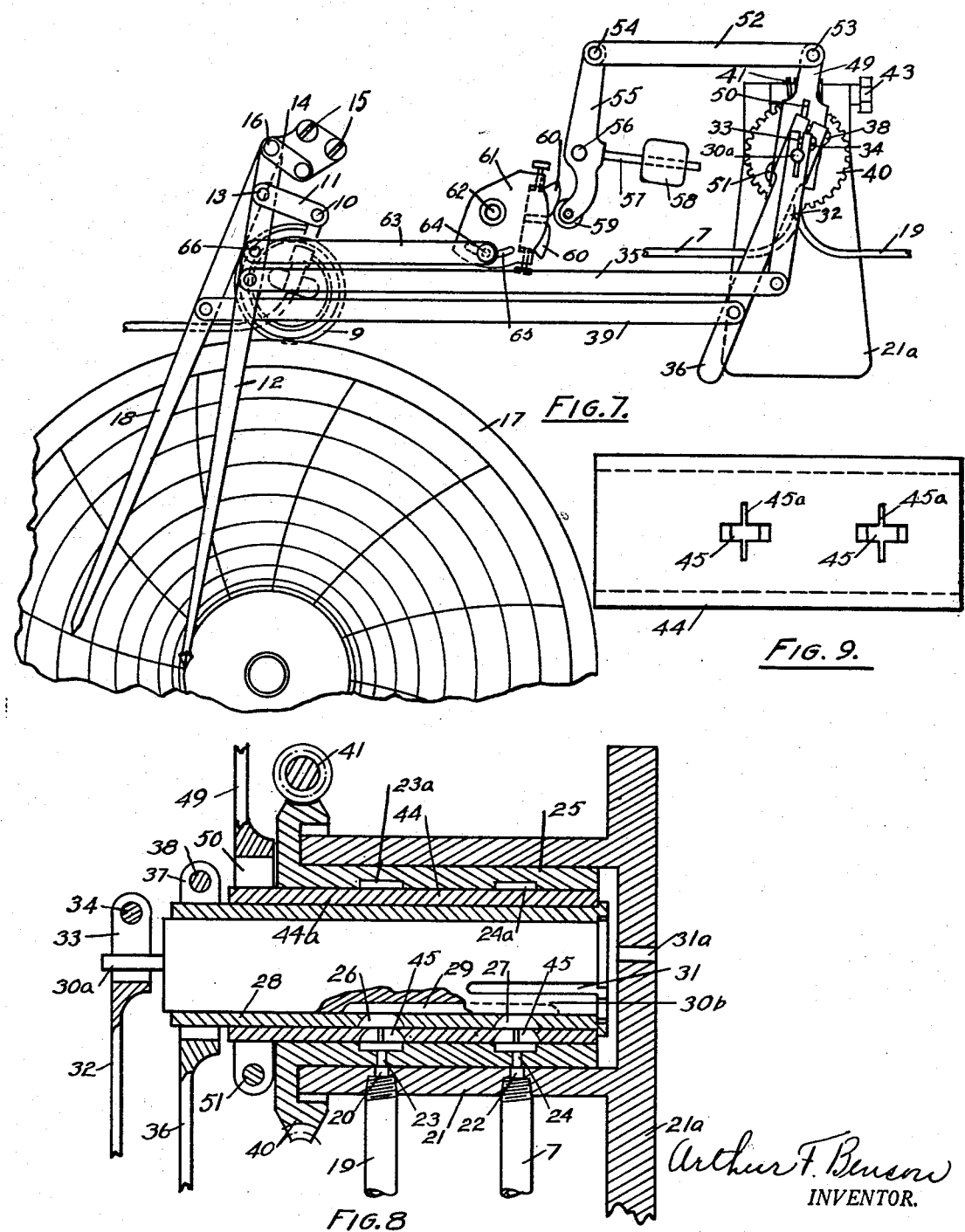

Patented Aug. 10, 1937

2,089,873

UNITED STATES PATENT OFFICE 2,089,873

CONTROLLING DEVICE

Arthur F. Benson, Erie, Pa., assignor to American Meter Company, New York, N. Y., a corporation of Delaware Application July 8, 1932, Serial No. 621,412

12 Claims. (Cl. 50—10)

The present invention is designed to control the condition of a medium through the action of a sensitive element sensitive to the condition of the medium, the sensitive element controlling fluid pressure actuating a means controlling the medium. As exemplified the controlling device of the invention is applied to a gas main where it is desired to control the gas pressure passing through the main and in this exemplification a controlling means in the nature of a valve is provided which controlling means is operated by fluid pressure controlled by a valve which valve in turn is controlled by a sensitive element sensitive to the pressure conditions of the gas. The invention also contemplates an adjustment of the controlling device so that its control of the medium (the pressure of the gas in the exemplification shown) may be readily effected, as desired. The invention further contemplates a means of controlling the rapidity of the response to a control action, or in other words, the sensitiveness of the device. Further features and details of the invention will appear from the specification and claims.

A preferred embodiment of the invention is illustrated in the accompanying drawings as follows:—

Fig. 7 is a view similar to Fig. 1 showing a modification.

Fig. 8 is a section similar to Fig. 5 but having a slight modification.

Figure 1:
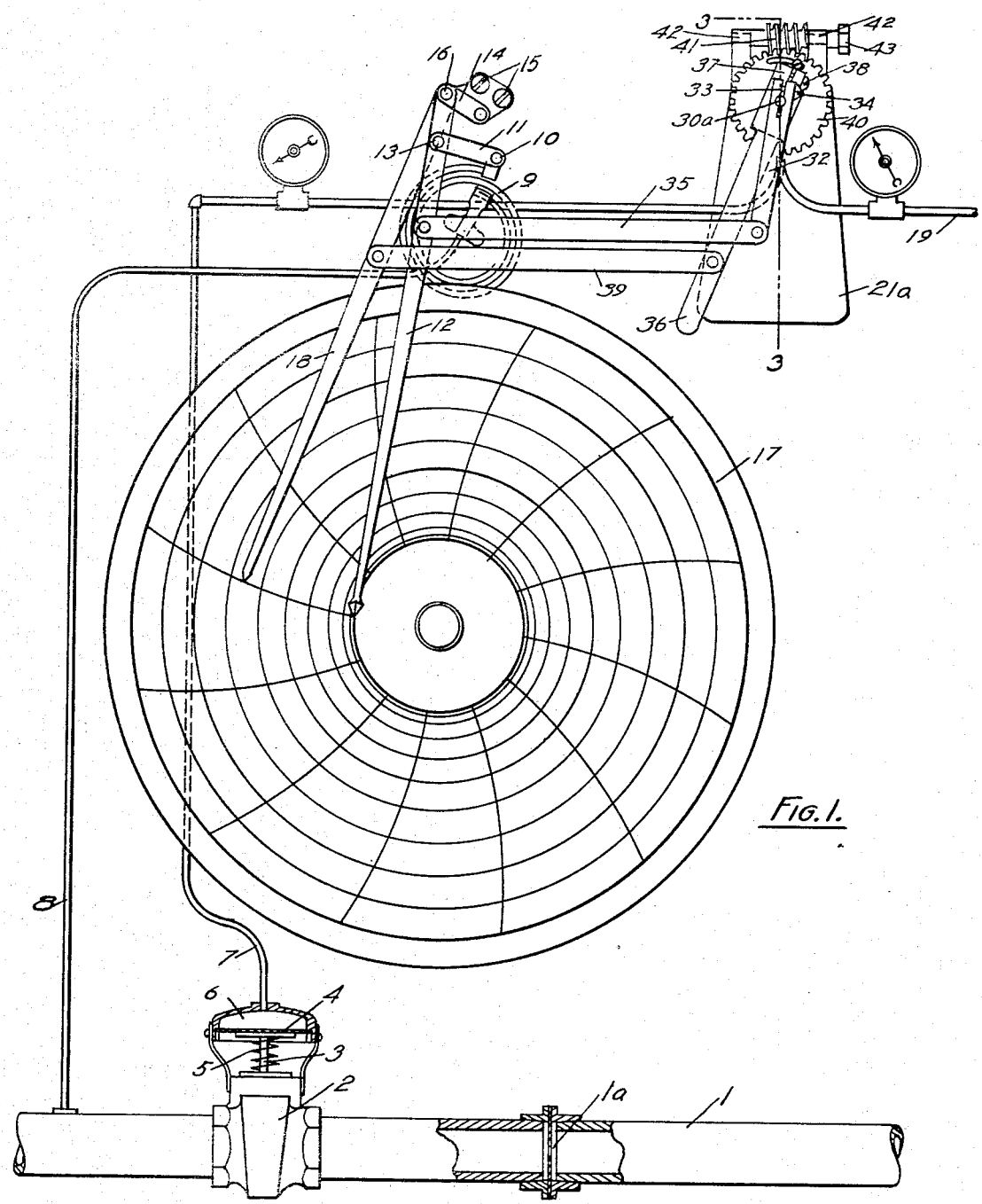
Fig. 1 is an elevation showing the controlling device, parts being in section to better show construction.

Fig. 9 an elevation of a limiting valve forming a part of the structure shown in Fig. 8.

1 marks the gas main, 1a an orifice meter in the main, 2 is the casing of a controlling valve, 3 a stem operating the control valve (not shown), 4 a diaphragm secured to the stem in such manner as to actuate the valve, 5 a spring operating on the diaphragm and affording a counter-pressure means, 6 a chamber in which the diaphragm operates and adapted to receive pressure fluid for operating the diaphragm and the valve, and 7 a pipe leading from the chamber 6 to the control valve.

A tube 8 leads from the pipe 1 to a sensitive element 9, this element being in the form of a Bourdon tube, one end being fixed in the usual manner and the opposite end connected by a pin 10 to a link 11, the link being connected by a pin 13 to a pen arm 12. The pen arm is mounted on a bracket 14 secured by screws 15 to any convenient support and the pen arm is pivoted on a pin 16 on the bracket and operates over recording discs 17 having the usual driving mechanism (not shown). A set arm 18 is also arranged over the recording discs and is of the same length as the pen arm and mounted on the same pin 16. The set pointer can be set across the discs to the pressure to be maintained and the pen arm swinging with relation to the set pointer indicates whether the control apparatus is maintaining this pressure. The mere setting of the set pointer in the present mechanism sets the control mechanism to operate at that pressure.

A tube 19 leads from a source of fluid under pressure. Ordinarily this leads from the pipe 1 providing that pressure is sufficient for operating the diaphragm 4. This inlet pipe leads to a supply port 20 in a fluid-pressure-control valve body 21. A control port 22 is also arranged in the body and connects with the pipe 7 leading to the diaphragm chamber. The ports 20 and 22 register with ports 23 and 24 in a throttling sleeve 25. The ports 23 and 24 deliver fluid to ports 26 and 27 arranged in an adjustable seat sleeve 28. There are a number of these ports arranged radially around the seat sleeve, these various radial ports 26 and 27 being connected by annular passages 23a and 24a in the sleeve 25. The ports 26 and 27 are adapted to be brought into register with a way 29 in a valve 30. The way 29 simply connects the ports 26 and 27. They are also adapted to be brought into register with an exhaust way 31 which communicates with an exhaust passage 31a in the body 21, the body being supported by a base, or plate 21a. The valve 30 has an extension 30a. An arm 32 has a split end 33 and a clamping bolt 34 operates on the split end to clamp the arm 32 on the extension 30a. The arm 32 is connected by a link 35 with the pen arm 12 so that the valve is immediately responsive to the sensitive element acting on the pen arm.

An arm 36 has a split end 37 which is mounted on the end of the seat sleeve 28 and the arm is clamped on this sleeve by a bolt 38. The arm 36 is connected by a link 39 with the set pointer 18 so that a movement of the set pointer is immediately communicated to the seat sleeve 28 and sets the seat sleeve and consequently the valve for operation at the pressure to which the set pointer is set. The sleeve 28 may have sufficient frictional engagement with the sleeve 25 to hold it in any desired adjusted position, or any other convenient means may be used for holding the arm 18 at the adjusted position and in some environments this may be automatically adjusted under which conditions the control of its position, of course, is subject to its connection.

A worm gear 40 is fixed on the throttling sleeve 25 and this is actuated by a worm 41 mounted in journals 42 on the plate 21a. The worm has a handle 43 by means of which it may be turned, thus operating the worm and adjusting the sleeve 25. As this sleeve 25 is adjusted, the ports 23 and 24 are moved more or less into, or out of register with the ports 20 and 22 so as to control, by throttling, the passage of fluid through these ports. In this way the rapidity with which pressure is delivered to the diaphragm may be controlled and the sensitiveness of the device thus adjusted. This is desirable to prevent fluttering and too rapid operation of the parts.

Figure 2:
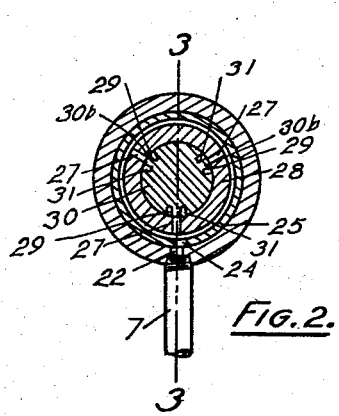
Fig. 2 is a section of the valve mechanism on the line 2—2 in Fig. 3.
Figure 3:
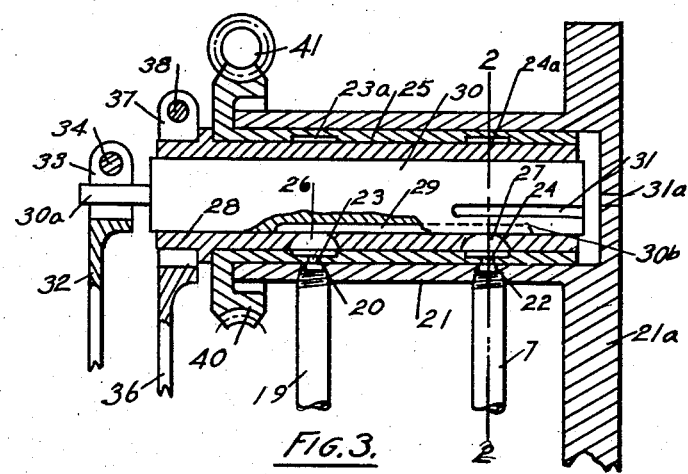
Fig. 3 is a section on the line 3—3 in Fig. 2.
Figure 4:
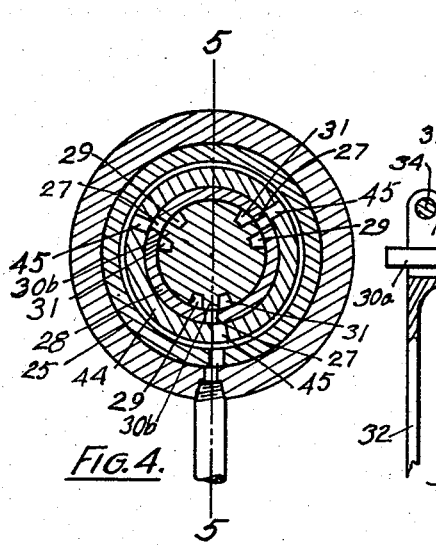
Fig. 4 is a section on the line 4—4 in Fig. 5 showing a modification.

In the construction shown in Fig. 4, the structure is similar to that shown in Figs. 1, 2, and 3 except that there is an additional sleeve 44 which is provided with ports 45 adapted to be varied, or moved with relation to the ports 26 and 27. This adds to the nicety with which the device can be throttled, but more particularly provides a device which may be made to respond to any other condition that may be desired. Thus this sleeve may be directly connected to the pen arm (connection not shown) and therefore rotated. When this occurs, there is not only a throttling action which may be adjusted by the sleeve 25, but this throttling action is varied through the action of the sleeve 44 with relation to the set position for the pen arm. Thus the delivery flow may be made more rapid, or less rapid, as the pen arm moves toward, or from the set position.

With this device, it will be noted, that with any pressure change there is an immediate response of the sensitive element which moves the pen arm and this in turn moves the valve and this immediately admits, or exhausts fluid from the diaphragm chamber and thus actuates the valve 2 to vary the control of the gas passage in the line 2 to maintain the desired pressure. The valve has a closure wall 30b. This closure wall approximates the width of the ports 26 and 27 so that when the pen arm is at set position over the pointer the pressure wall 30b is exactly in closing position on the ports 26 and 27 and fluid is trapped under the then pressure in the chamber 6 and the parts remain in this static position so long as the pressure conditions in the pipe 1 remain constant. With any change in the pressure in the pipe 1 the sensitive element responds, moving the pen arm and this moves the valve 30 one way, or the other, depending on the pressure change in the pipe, thus connecting the way 29 admitting a fresh supply of fluid from the ports 26 through the way 29 to the port 27 and thence to the diaphragm chamber, thus partially closing the valve, or if the reverse condition takes place, bringing the exhaust port, or way 31, into register with the port 27 and thus exhausting fluid from the diaphragm chamber with a resultant opening of the valve and in either instance as soon as the pressure condition in the pipe reaches normal, or the set pressure, the pen arm responsive to the sensitive element is again moved to the set position and as it moves to the set position brings the closure walls to neutral position so that the parts then are again set in static position and held there until there is another change in condition in the gas pressure.

Figure 5:
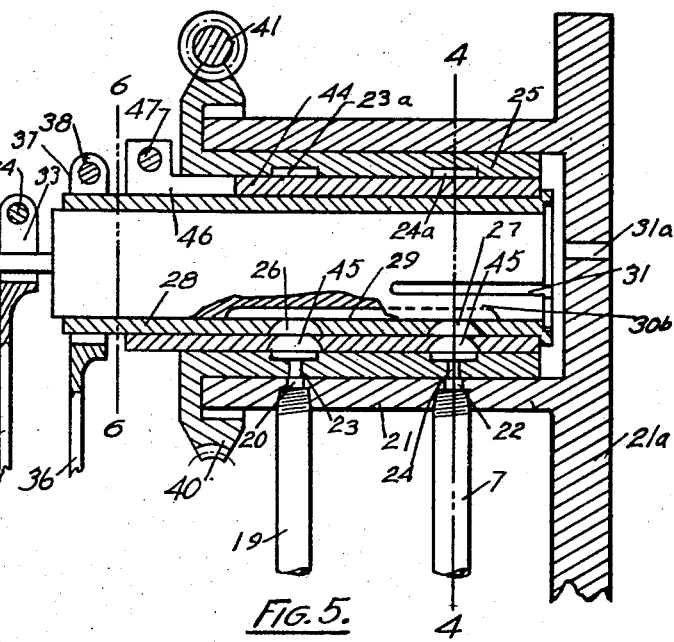
Fig. 5 is a section on the line 5—5 in Fig. 4.
Figure 6:
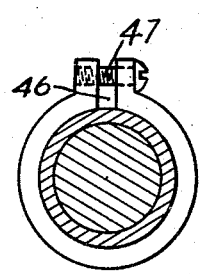
Fig. 6 is a section on the line 6—6 in Fig. 5.

In Fig. 5 the throttling sleeve 44 may be clamped on the controlling valve 28 and this is effected by splitting the end of the sleeve at 46 and providing a clamping screw 47. Where it is desired to utilize the throttling sleeve 44 as a limiting valve for the controlling valve 28 this may be accomplished as indicated in Figs. 7, 8, and 9. The parts in the valve mechanism are identical with those shown in Fig. 5 except that the throttling, or limiting sleeve 44a in the modification has its ports 45 provided with small slits 45a which extend circumferentially from the ports 45 so that the limiting, or throttling sleeve 44a cannot completely eliminate the movement of air to the controlling valve 28. With this structure as provided the link hook-up with the arms 32 and 36 is the same as in the structure shown in Fig. 1 and contemplated in the structures shown in Figs. 4 and 5. An arm 49 has a split end 50 which may be clamped by a screw 51 on the limiting valve sleeve 44a. A link 52 is connected to this arm by a pin 53 and by a pin 54 with a lever 55. The lever 55 is pivoted at 56 and has an arm 57 extending from it which carries a weight 58, the purpose of the weight being to move the lever in one direction. The end of the lever is provided with a cam roller 59 which operates upon the adjustable cams 60 carried by a rock arm 61. The rock arm is pivoted on a pin 62 and a link 63 is connected with the rock arm by a pin 64, the pin being adjustable in a slot 65 in the rock arm. The link 63 is connected by a pin 66 with the pen arm 12 and is, therefore, responsive to the pressure element.

The purpose of the limiting valve in this connection is to limit the action of the control valve. Where the control valve does not have such a limitation there is a tendency for an over-running of the device giving to the pen arm a waving action. With the present construction, when the pen arm reaches a certain movement from the point established by the arm 18 the linkage from this pen arm thus described moves the limiting valve 44a closing off the port connection between the ports 45 of the limiting valve and the ports 26 of the controlling valve. If, however, the conditions have so definitely changed that a further movement of the valve 2 is necessary for the pressure control there will be a continued movement through the slits 45a to prevent the control mechanism from being put entirely out of action.

What I claim as new is:—

1. In a device for controlling the flow of fluids through a conduit, the combination with a valve mechanism including a seat having a supply port and a delivery port, and a valve having admission and exhaust ways and a neutral closure wall, said valve being rotatively adjustable to selectively place said delivery port into communication with either the admission or the exhaust ways, or to close both ports, of means for varying the position of the seat so as to vary the normal locations of the ports with respect to the neutral closure wall and the admission and exhaust ways of said valve, pressure-responsive means for regulating the flow of fluid through said conduit, a pressure-sensitive actuator member adapted to be connected with said conduit and movable independently of the flow regulating means, means movable with the actuator member for directly connecting the same with the valve, and means for varying the volume of flow through the seat port so as to vary the sensitiveness of said pressure-responsive means.

2. In a device for controlling the flow of fluids through a conduit, the combination with a valve mechanism including a seat having a supply port and a delivery port adapted to be connected with said flow controlling device, and a valve having admission and exhaust ways and a neutral closure wall, said valve being adjustable to selectively place said delivery port into communication with either the admission or the exhaust ways, or to close both ports, of means for varying the position of the seat so as to vary the normal locations of the ports with respect to the neutral closure wall and the admission and exhaust ways of said valve, pressure-responsive means for regulating the flow of fluid through said conduit, a pressure-sensitive actuator member adapted to be connected with said conduit and movable independently of the flow regulating means, means movable with the actuator member for directly connecting the same with the valve, throttling means for varying the volume of flow through the port so as to vary the sensitiveness of the said pressure-responsive means, and devices for varying the position of the throttling means as the valve of said valve mechanism moves toward or from its normal neutral position.

3. In a device for controlling flow of fluids through a conduit, the combination of a valve mechanism including a seat sleeve having ports therein, one of said ports being adapted to be connected with said flow controlling device, a valve having admission and exhaust ways adapted to be brought into register with ports of said sleeve, said valve having a closure wall between the ways adapted to close said ports, means for adjusting said seat sleeve in such manner as to change the normal positions of the ports therein with respect to the valve, throttling means adjustable to vary the volume of liquid flow through said seats, a pressure-sensitive means adapted to be connected with the conduit and having a member movable independently of the flow regulating means, means movable with the last mentioned member for directly connecting the same with the valve in such manner that movements corresponding to any movements of the actuator are directly imparted to the valve, and devices for varying the adjustment of the throttling means as the valve is moved to and from its normal position.

4. In a device for controlling the flow of fluids through a conduit, the combination of a valve mechanism including a body having a supply port and a delivery port adapted to be connected with said flow controlling device, a throttling sleeve arranged within the body and having ports adapted to be brought into or out of register with the ports of said valve body so as to vary the volume of flow through said ports, a seat sleeve rotatable within the throttling sleeve and having ports adapted to register with the ports of the throttling sleeve, a valve rotatable within the seat sleeve and having admission ways and exhaust ways adapted to be brought into register with the ports of the seat sleeve, said valve having a closure wall adapted to close the ports of the seat sleeve, a pressure-sensitive actuator member adapted to be connected with the conduit, a pivoted actuator arm connected with said actuator member, means movable with said actuator arm for directly connecting the same with the valve in such manner that movements corresponding to any movements of the actuator arm are directly imparted to the valve, and a second pivotally supported arm connected with said seat sleeve, the last mentioned connection being so constructed and arranged that adjustment of the seat sleeve may be effected by adjustments of said arm.

5. In a device for controlling the flow of fluids through a conduit, the combination of a valve mechanism controlling the flow of pressure to said pressure-responsive control means and adapted to be connected with a source of fluid supply under pressure, said valve mechanism including a supply-control valve adapted to admit and exhaust fluid under pressure to the controlling device, a limiting valve for said supply-control valve, a pressure-sensitive actuator member adapted to be connected with said conduit and having a movable portion, means movable with the movable portion of the actuator member for directly connecting the same with the valve in such manner that movements of said actuator member are positively imparted to the valve, and means connecting the limiting valve with said actuator in a manner to be operated by movements of the latter, said limiting valve having means for limiting the action of the pressure-responsive control means.

6. In a device for controlling the flow of fluids through a conduit, the combination of a valve mechanism controlling the flow of pressure to said pressure-responsive control means and adapted to be connected with a source of fluid supply under pressure, said valve mechanism including a supply-control valve adapted to admit and exhaust fluid under pressure to the controlling device, a limiting valve for said supply-control valve, a pressure-sensitive actuator member adapted to be connected with said conduit and having a movable portion, means movable with the movable portion of the actuator member for directly connecting the same with the valve in such manner that movements of said actuator member are positively imparted to the valve, means connecting the limiting valve with said actuator in a manner to be operated by movements of the latter, and means for adjusting the limiting valve so as to vary the position at which it is made effective.

7. In a device for controlling the flow of fluids through a conduit, the combination of a valve mechanism adapted to be connected with a source of fluid supply under pressure, said valve mechanism including a supply-control valve adapted to admit and exhaust fluid under pressure to the flow controlling device, a limiting valve for said supply-control valve, a pressure-sensitive actuator member adapted to be connected with said conduit and having a movable portion, means movable with the movable portion of the actuator member for directly connecting the same with the valve in such manner that movements of said actuator member are positively imparted to the valve, means connecting the limiting valve with said actuator in a manner to be operated by movements of the latter, and means for adjusting the limiting valve so as to vary the position at which it is made effective, a cam connected with the movable portion of said control member, and means connected with said limiting valve having engagement with said cam in such manner as to vary the position at which the limiting valve is made effective.

8. In a device for controlling the flow of fluids through a conduit, the combination of a valve mechanism adapted to be connected with a source of fluid supply under pressure, said valve mechanism including a supply-control valve adapted to admit and exhaust fluid under pressure to the flow controlling device, a limiting valve for said supply-control valve, a pressure-sensitive actuator member adapted to be connected with said conduit and having a movable portion, means movable with the movable portion of the actuator member for directly connecting the same with the valve in such manner that movements of said actuator member are positively imparted to the valve, means connecting the limiting valve with said actuator in a manner to be operated by movements of the latter, means for adjusting the limiting valve so as to vary the position at which it is made effective, cams movably connected with the movable member of the actuator means, and means connected with the limiting valve having engagement with said cams, the connection of said cams with the movable portion of the actuator member and the engagement between the limiting valve and the cams being so constructed and arranged as to vary the moment in the action of the controlling valve at which the limiting valve begins to act and completes its limiting action.

9. In a device for controlling the flow of fluids through a conduit, the combination of a valve mechanism adapted to be connected with a source of fluid supply under pressure, a valve mechanism including a seat sleeve having ports therein, one of said ports being adapted to be connected with said flow controlling device, a limiting valve having ports therethrough, said ports being so positioned as to be placed in register with the ports of the seat sleeve, a controlling valve rotatable within the limiting valve and having ports complemental to the ports of the limiting valve, a pressure-sensitive actuator member adapted to be connected with said conduit and having a movable portion, means movable with the movable portion of the actuator member for directly connecting the same with said controlling valve in such manner that movements of the actuator member are positively imparted to the valve, and means connecting the limiting valve with said actuator in such manner as to be operated by movements of the latter so as to vary the positions of the ports of the limiting valve with respect to the ports of the seat valve and the ports of the controlling valve.

10. In a device for controlling the flow of liquids through a conduit, the combination of a valve mechanism adapted to be connected with a source of fluid supply under pressure, said valve mechanism including a seat sleeve having ports therein, one of said ports being adapted to be connected with said flow controlling device, a limiting valve having ports therethrough, said ports being so positioned as to be placed in register with the ports of the seat sleeve, a controlling valve rotatable within the limiting valve and having ports complemental to the ports of the limiting valve, a pressure-sensitive actuator member adapted to be connected with said conduit and having a movable portion, means movable with the movable portion of the actuator member for directly connecting the same with said controlling valve in such manner that movements of the actuator member are positively imparted to the valve, a lever connected with the limiting valve, cams positioned to engage said lever, and means connecting said cams with said pressure-sensitive actuator member.

11. In a device for controlling the flow of fluids through a conduit, the combination of a valve mechanism adapted to be connected with a source of fluid supply under pressure, said valve mechanism including a supply-control valve adapted to admit and exhaust fluid under pressure to the flow controlling device, a limiting valve for said supply-control valve, a pressure-sensitive actuator member adapted to be connected with said conduit and having a movable portion, means movable with the movable portion of the actuator member for directly connecting the same with the valve in such manner that movements of said actuator member are positively imparted to the valve, means connecting the limiting valve with said actuator in a manner to be operated by movements of the latter, said limiting valve being provided with a minute leak connection for preventing the complete elimination of the control by said pressure controlling valve.

12. In a device for controlling the flow of liquid through a conduit, the combination of a valve mechanism adapted to be connected with a source of fluid supply under pressure, said valve mechanism including a pressure supply-control valve provided with an admission port and an exhaust port adapted to be connected with said flow controlling device, and a neutral closing portion, said neutral portion being so constructed and arranged as to trap the fluid from said source of fluid pressure supply while in normal closed position, a rotary member enclosing said valve and having ports complemental to the ports of the latter, a pressure-sensitive actuator member adapted to be connected with the conduit and having a movable portion, means directly connecting the movable portion of the pressure-sensitive actuator with said valve in such manner that movements of said actuator member are positively imparted to the valve, and means for adjusting said sleeve so as to vary the positions of the ports thereof with respect to the positions of the ports of the valve.

ARTHUR F. BENSON.